United States Patent [19]

Raistrick et al.

[11] 4,340,652
[45] Jul. 20, 1982

[54] TERNARY COMPOUND ELECTRODE FOR LITHIUM CELLS

[75] Inventors: Ian D. Raistrick, Menlo Park; Ned A. Godshall; Robert A. Huggins, both of Stanford, all of Calif.

[73] Assignee: The United States of America as represented by the United States Department of Energy, Washington, D.C.

[21] Appl. No.: 173,554

[22] Filed: Jul. 30, 1980

[51] Int. Cl.³ .................... H01M 4/40; H01M 6/36
[52] U.S. Cl. ............................ 429/112; 429/199; 429/218; 252/182.1
[58] Field of Search .............. 429/103, 112, 218, 199, 429/221, 223, 224; 252/182.1; 423/593, 594, 596, 641; 75/134 A, 170

[56] References Cited

U.S. PATENT DOCUMENTS

| | | | |
|---|---|---|---|
| 3,898,096 | 8/1975 | Heredy et al. | 429/103 |
| 3,969,139 | 7/1976 | Lai | 429/103 |
| 4,011,374 | 3/1977 | Kaun | 429/103 X |
| 4,130,500 | 12/1978 | Melendres et al. | 429/103 X |
| 4,164,069 | 8/1979 | Tomczuk | 429/103 X |

OTHER PUBLICATIONS

K. Mizushima et al., "$Li_xCoO_2$ ($0 \leq X \leq 1$), A New Cathode Material for Batteries of High Energy Density," Mat. Res. Bull., 15, 783 (1980).

*Primary Examiner*—Anthony Skapars
*Attorney, Agent, or Firm*—Gwenetta D. Hill; Roger S. Gaither; Richard G. Besha

[57] ABSTRACT

Lithium-based cells are promising for applications such as electric vehicles and load-leveling for power plants since lithium is very electropositive and of light weight. One type of lithium-based cell utilizes a molten salt electrolyte and normally is operated in the temperature range of about 350°–500° C. Such high temperature operation accelerates corrosion problems. The present invention provides an electrochemical cell in which lithium is the electroactive species. The cell has a positive electrode which includes a ternary compound generally represented as Li-M-O, wherein M is a transition metal. Corrosion of the inventive cell is considerably reduced.

16 Claims, 2 Drawing Figures

TERNARY COMPOUND ELECTRODE FOR LITHIUM CELLS

The U.S. Government has rights in this invention pursuant to Contract No. EC-77-S-02-4506 between the U.S. Department of Energy and Stanford University.

BACKGROUND OF THE INVENTION

1. Field of the Invention

This invention relates generally to electrochemical cells in which lithium is the active species, and more particularly to high temperature electrochemical cells having a molten salt electrolyte.

2. Prior Art

There is a great deal of current interest in better methods for energy storage. This is especially important for applications such as electric vehicles and the large scale storage of electric energy to level the load of stationary power plants. It does not appear that major improvements in important parameters, such as the amount of energy stored per unit weight or volume, at reasonable costs, can be expected from systems that employ aqueous electrolytes.

One of the developments currently being pursued involves a lithium-based cells, since lithium is very electropositive and light weight. In such cells, the negative electrode is a lithium alloy (typically either lithium-aluminum or lithium-silicon), the positive electrode is an iron sulfide, and the electrolyte is a molten salt, such as the eutectic composition in the lithium chloride-potassium chloride system. Because of the high melting point of such salts, operation is normally in the temperature range of about 350–500 degrees centigrade.

Various degradation processes, such as corrosion of the cell container, seals, and other components, are accelerated by such high temperatures. Sulfides are highly reactive under the high temperatures required, and use of iron sulfides as the cathode material is a major factor in the high corrosion incurred in these lithium-based cells. Additionally, it is believed that potassium ions from the molten salt electrolyte tend to compete with lithium ions at iron sulfide cathodes. The potassium ions may then form reaction products in the positive electrode which decompose slowly and reduce the current density.

SUMMARY OF THE INVENTION

It is an object of the present invention to reduce the corrosion incurred in operation of lithium electrochemical cells employing molten salt electrolytes.

It is another object that an electrochemical cell be more easily manufactured, and that the production cost of component parts is lowered.

It is a further object of the present invention that a lithium-based electrochemical cell be rechargeable and have a higher charge capacity than is presently available.

Additional objects, advantages and novel features of the invention will be set forth in part in the description which follows, and in part will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the cell of this invention may comprise a negative electrode, an electrolyte, and a positive electrode including a ternary compound represented by Li-M-O wherein Li is lithium, M is a transition metal, and O is oxygen.

An electroactive species of the cell is lithium, and the cell is operated by heating the electrolyte to above a melting point thereof, normally from about 350° C. to about 500° C.

In a further aspect of the present invention, an electrode may comprise an inner grid member and an outer oxide layer attached to the inner grid member. The layer includes a lithium species and a transition metal species, preferably iron, nickel or cobalt. The inventive electrode is useful as a positive electrode and current collector in an electrochemical cell having lithium as the electroactive species thereof.

Accordingly, this invention provides an electrochemical cell which may be operated at temperatures in the range of about 350° C. to about 500° C. with significantly decreased corrosion by comparison with prior, high temperature lithium cells utilizing sulfides as the positive electrodes thereof. Additionally, an electrochemical cell in accordance with the present invention provides a relatively high charge capacity and can utilize a variety of known electrolyte compositions, such as lithium chloride/potassium chloride, or lithium chloride/lithium bromide/lithium fluoride.

Applications contemplated for the inventive electrochemical cells include electric vehicles and load-leveling for power plants.

BRIEF DESCRIPTION OF THE DRAWINGS

The accompanying drawings, which are incorporated in and form a part of the specification, illustrate aspects of an electrochemical cell embodiment of the present invention and, together with the description, serve to explain the principles of the invention.

In the drawings.

DETAILED DESCRIPTION OF THE INVENTION

Figure 1:
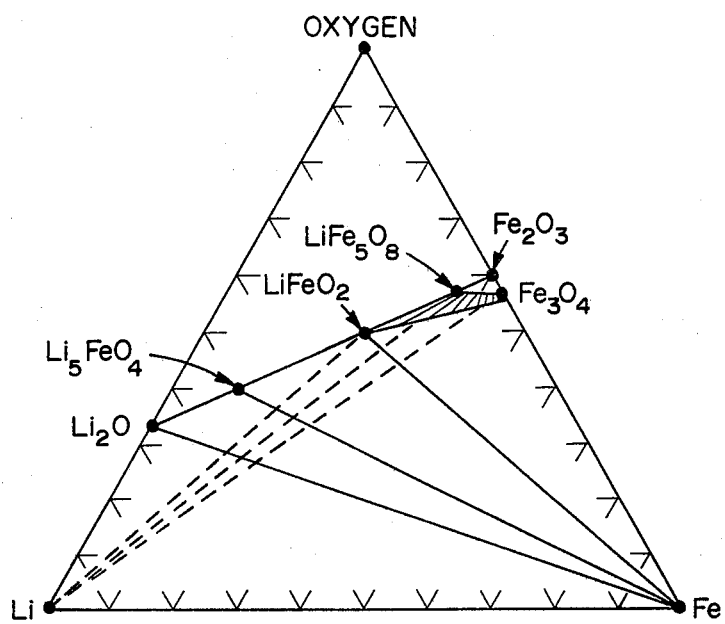
FIG. 1 represents an isotherm for a ternary system embodiment of the present invention at 400° C.; and, FIG. 2 represents an isotherm for another ternary system embodiment of the present invention at 400° C.

The present invention concerns electrochemical cells including a negative electrode, a positive electrode, and an electrolyte in ionic communication with both of the electrodes during operation of the cell. More particularly, the present invention relates to high temperature, molten salt electrochemical cells having lithium as the electroactive species which normally utilize a lithium alloy (typically either lithium-aluminum or lithium-silicon) as the material for the negative electrode. The molten salt electrolyte typically has a melting point of between about 350° C. to about 500° C. and may be the eutectic composition or other composition in the lithium chloride-potassium chloride system, or in the lithium chloride-lithium bromide-lithium fluoride system.

To date, the positive electrode of such high temperature, lithium-based cells has normally been composed of an iron sulfide (FeS and/or FeS$_2$). Such an iron sulfide positive electrode material is highly corrosive, particularly under the high temperatures and desired long term operations of such cells. Additionally, where the prior iron sulfide has been used as the positive electrode material, the current collector material thereof has usually needed to be protectively coated with, for example, iron boride in order to retard sulfide reactions between the iron sulfide of the positive electrode material and the current collector material.

Broadly, the present invention utilizes oxide compounds, rather than the prior sulfide compounds, as materials for a positive electrode in lithium-based cells. More particularly, these oxide compounds are ternary compositions generally represented by Li-M-O where Li represents lithium, M represents a transition metal, and O represents oxygen. Preferably, the transition metal of these ternary compounds is manganese, iron, cobalt or nickel due to the practical advantage of lighter weights and higher specific energies. More preferably, the transition metal is selected from the group consisting of iron, cobalt and nickel because the kinetics of systems based upon iron, cobalt, and nickel have been found to be quite favorable, whereas the kinetics of a manganese system is inconsiderably slower and thus inferior to the most preferred transition metals.

For example, choice of iron as the transition metal results in the ternary compound which would be generally represented as Li-Fe-O. Similarly, choice of cobalt as the transition metal results in the ternary compound generally represented as Li-Co-O, and choice of nickel as the transition metal results in the ternary compound generally represented as Li-Ni-O. Each of these generally represented ternary compounds includes a plurality, or system, of compounds as follows.

The iron system includes $Fe_2O_3$, $Fe_3O_4$, $LiFe_5O_8$, $LiFeO_2$, $Li_5FeO_4$ and mixtures thereof. The cobalt system includes $CoO$, $Co_3O_4$, $LiCoO_2$ and mixtures thereof. The nickel system includes $NiO$, $LiNiO_2$, $LiNi_4O_5$ and mixtures thereof.

Although each of these systems includes at least one binary compound, a positive electrode in accordance with the present invention, if initially composed of such a binary compound, will proceed to change in composition to include at least one of the ternary compounds in the particular system during operation of the lithium-based cell. This shall be more fully described hereinafter.

The structures of the ternary compounds of each system have been found to depend largely on the metal-to-oxygen ratio. For example, nearly all of the ternary compounds with about 57.1 atomic percent oxygen exist with a spinel structure (regardless of the lithium-to-transition metal ratio), whereas nearly all of the ternary compounds with about 50 atomic percentage oxygen exist with a sodium chloride-related structure.

The ternary compounds of the present invention do not substantially react with the potassium ions of conventional molten salt electrolytes, and thus current densities of lithium-based cells are not adversely affected by undesirable reactions. It has been surprisingly discovered that the reaction kinetics for these most preferred ternary compounds is quite fast, and use of a cathode having the ternary compound in a lithium-based electrochemical cell results in relatively high current densities. Aspects of the present invention are exemplified as follows.

The electrochemical reduction of positive electrodes initially composed of MnO, $LiFeO_2$, $Li_5FeO_4$ and $LiCoO_2$ by reaction with lithium was conducted in an electrochemical cell of the type

wherein M=Mn, Fe, or Co respectively. Table I, below, summarizes data from these lithium reactions.

TABLE I

| Compound | $\Delta G_f^\circ$ (kcal/mole) | RANGE OF x ($\Delta x$) | CELL POTENTIAL (V vs. Al,Li$_{0.9}$Al) | CURRENT DENSITY (mA/cm$^2$) | SPECIFIC ENERGY (Wh/kg) |
|---|---|---|---|---|---|
| MnO | −80.34 | 2.0 | 0.612 | 2–4 | 237 |
| Li$_5$FeO$_4$ | −399.88 | 1.5 | 0.997 | 10–12 | 313 |
| LiFeO$_2$ | −154.18 | 3.0 | 1.023 | 10–12 | 413 |
| LiCoO$_2$ | −131.62 | 3.0 | 1.336 | 12–15 | 539 |

Table 1, above, illustrates that the systems of ternary iron compounds and ternary cobalt compounds perform quite favorably as positive electrode materials in high-temperature molten salt cells, and yield three equivalents of lithium per mole at attractive voltages. The theoretical specific energies of the iron and cobalt systems are 900 and 1110 Wh/kg with respect to pure lithium, respectively. The corresponding values, using Al, Li$_{0.9}$Al negative electrode, are about 413 Wh/kg for the iron compounds and about 539 Wh/kg for the cobalt compounds. Table 1 also illustrates that the kinetics and voltage of the manganous oxide compound may be too low for practical uses in molten salt batteries.

Referring to FIG. 1, a pseudo-ternary isotherm for the Li-Fe-O system illustrates several important aspects of the present invention. Three ternary compounds of the iron system (LiFe$_5$O$_8$, LiFeO$_2$, and Li$_5$FeO$_4$) all lie on the tie line between Li$_2$O and Fe$_2$O$_3$, which also represents a line of constant, 3+ valence for iron. The dashed lines in FIG. 1 illustrate increasing quantities of the lithium species from the initial electrode starting material (Fe$_3$O$_4$, LiFe$_5$O$_8$ and LiFeO$_2$ respectively).

The presence of the marginally stable compound Li$_5$FeO$_4$ splits the reaction path into two constant-voltage tie triangles which differ slightly in voltage. Accordingly, the dashed lines in FIG. 1 represent the course of change in the average composition of a positive electrode based on the iron system in accordance with the present invention as the electrochemical cell is discharged. For example, where the positive electrode has the initial composition LiFeO$_2$, the complete reduction thereof would be represented by equation (1) below.

which could also be expressed as the combination of two reactions, represented by equations (2) and (3) as follows:

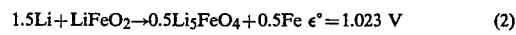

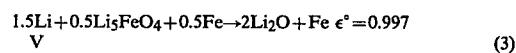

These reactions are reversible, and thus illustrate that electrochemical cells of the present invention are rechargeable, so long as not cycled beyond compositional limits.

Figure 2:
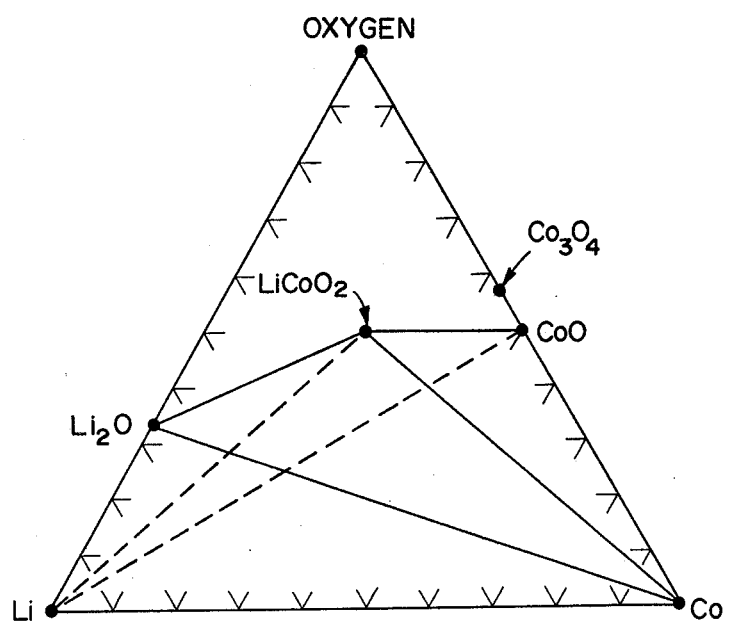

FIG. 2 is analogous to FIG. 1, but represents the Li-Co-O system. The Li-Ni-O system is not herein illustrated, but is analogous to FIGS. 1 and 2.

Both FIGS. 1 and 2 show schematically that as lithium electrochemically reacts with the initial cathode material, then it is possible for the cathode composition to pass through one, two and three-phase regions. Thus, the ternary compound represented by Li-M-O of the inventive electrode describes the overall electrode composition in general, regardless of the particular phase, or number of phases, which may be present in the electrode. Additionally, FIG. 1 specifically illustrates that the inventive electrode is stable with respect to iron under normal operating conditions of a molten salt, lithium-based cell, which is representative of an important general aspect in fabricating an electrode embodiment as shall now be more fully described.

In the best mode contemplated, an electrode in accordance with the present invention comprises an inner grid member and an outer oxide layer attached to the inner grid member. By grid member is meant that the geometrical configuration of the electrode may take a variety of forms, but preferably has a relatively large surface area. For example, a particularly preferred macroscopic configuration for the grid member is as a screen having a plurality of holes therethrough, which configuration is known and used for prior known positive electrodes.

It is desirable that the inner grid member be of a material suitable for collecting and transporting electrons, so that the inventive electrode also functions as a current collector. A variety of materials are suitable, for example iron, nickel, titanium, alloys of these, and graphite.

The outer oxide layer includes a lithium species and another species. The another species is a transition metal as has been previously described, more preferably the another species is iron, nickel or cobalt. The outer layer is attached to the inner core of the grid member by a variety of means, for example by pressing a powdered form of the desired layer's composition upon the inner core either cold-pressed or under elevated temperature conditions so as to attach the layer thereupon, or by utilizing a binder such as powdered graphite. The outer layer typically may be attached in air, which greatly reduces the production cost thereof compared to the prior iron sulfide cathodes.

Additionally, unlike the known current collectors in iron sulfide systems, which must be coated with, for example, iron boride in order to protect the current collector material from reaction with sulfide, the various suitable materials for the inner grid member of the present invention are characterized by substantially no reaction with the ternary compounds comprising the outer layer. Further, the electrode embodiment has markedly reduced corrosion problems. As has already been specifically noted, iron does not substantially react with the ternary compounds, nor do a variety of other materials, for example nickel, titanium, alloys of these, and graphite. Thus, for example, a particularly preferred material for the grid member is iron, due to its low cost and ready availability, to which is attached, or bonded, an admixture of lithium oxide powder and iron oxide powder as the ternary compound comprising the outer layer.

Such a particularly preferred admixture may be prepared by initially mixing lithium carbonate with iron oxide in a non-reactive, refractory container such as alumina, and roasting this admixture in air at temperatures of from about 700° C. to about 950° C. Such an admixture of lithium carbonate with iron oxide is preferably in predetermined proportions which are selected from the desired, final stoichiometric formula.

In summary, the present invention provides an electrochemical cell in which corrosion is substantially reduced. Further, the electrode embodiments may be fabricated relatively simply, inexpensively, and without the necessity of special gaseous environments.

The foregoing description of preferred embodiments of the invention have been presented for purposes of illustration and description. They are not intended to be exhaustive or to limit the invention to the precise forms disclosed, and obviously many modifications and variations are possible in light of the above teaching. These embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. In an electrochemical cell with lithium as the electroactive species thereof, said cell having a positive electrode, a negative electrode and an electrolyte, said electrolyte having a melting point of about 350° C. to about 500° C., the improvement comprising:

said positive electrode including a ternary compound represented by Li-M-O wherein Li is lithium, M is a transition metal, and O is oxygen.

2. The electrochemical cell as in claim 1 wherein M of said ternary compound is selected from the group consisting of iron, cobalt and nickel.

3. In an electrochemical cell with lithium as the electroactive species thereof, said cell having a positive electrode, a negative electrode and an electrolyte, the improvement comprising:

said positive electrode having at least one ternary compound in ionic communication with said electrolyte, said at least one ternary compound including lithium, iron and oxygen.

4. The electrochemical cell as in claim 3 wherein said at least one ternary compound is a system of compounds including $LiFe_5O_8$, $LiFeO_2$, $Li_5FeO_4$ and mixtures thereof.

5. In an electrochemical cell with lithium as the electroactive species thereof, said cell having a positive electrode, a negative electrode and an electrolyte, the improvement comprising:

said positive electrode having at least one ternary compound in ionic communication with said electrolyte, said at least one ternary compound including lithium, cobalt and oxygen.

6. The electrochemical cell as in claim 5 wherein said at least one ternary compound is a system of compounds including $LiCoO_2$.

7. In an electrochemical cell with lithium as the electroactive species thereof, said cell having a positive electrode, a negative electrode and an electrolyte, the improvement comprising:

said positive electrode having at least one ternary compound in ionic communication with said electrolyte, said at least one ternary compound including lithium, nickel and oxygen.

8. The electrochemical cell as in claim 7 wherein said at least one ternary compound is a system of compounds including $LiNiO_2$ and $LiNi_4O_5$.

9. An electrode comprising:
a grid member and outer oxide layer attached to said grid member, said grid member being of a material suitable for collecting and transporting electrons, said layer including a lithium species and another species selected from the group consisting of iron, nickel and cobalt.

10. The electrode as in claim 9 wherein said grid member includes iron, nickel, titanium, alloys thereof, or graphite.

11. The electrode as in claim 9 wherein said layer has a ternary compound therein, said ternary compound including lithium, iron and oxygen.

12. The electrode as in claim 11 wherein said ternary compound is a system of compounds including $LiFe_5O_8$, $LiFeO_2$, $Li_5FeO_4$ and mixtures thereof.

13. The electrode as in claim 9 wherein said layer has a ternary compound therein, said ternary compound including lithium, cobalt and oxygen.

14. The electrode as in claim 13 wherein said ternary compound is a system of compounds including $LiCoO_2$.

15. The electrode as in claim 9 wherein said layer has a ternary compound therein, said ternary compound including lithium, nickel and oxygen.

16. The electrode as in claim 15 wherein said ternary compound is a system of compounds including $LiNiO_2$ and $LiNi_4O_5$.

* * * * *